United States Patent Office 3,220,966
Patented Nov. 30, 1965

3,220,966
HOT MELT ADHESIVE COMPOSITIONS BASED ON AN ETHYLENE:PROPYLENE COPOLYMER
Thomas P. Flanagan, Greenbrook Township, N.J., assignor to National Starch and Chemical Corporation, New York, N.Y., a corporation of Delaware
No Drawing. Filed Feb. 28, 1963, Ser. No. 261,838
6 Claims. (Cl. 260—27)

This invention relates to novel hot melt adhesive compositions. More particularly, it relates to hot melt adhesive compositions comprising blends of elastomeric materials and resin tackifiers in a polyolefinic carrier.

A class of adhesive compositions known as hot melt adhesives have enjoyed continually increasing usage in many industrial applications. These hot melt adhesives, or hot melts, as they are commonly designated, are solid or semi-solid combinations of film forming resins, tackifying resins, rubbery polymers, plasticizers, waxes and similar materials which may be added to the composition in order to impart various properties thereto. Adhesive bonds derived from hot melts are particularly useful because of their tackiness in the molten state and their ultimate highly flexible nature. In addition, hot melts yield adhesive bonds that display resistance to embrittlement under conditions of extreme cold, thereby making them ideal for adhesive applications requiring exposure to low temperatures, such as, for example, frozen food packaging.

In spite of the advantages to be realized by the use of hot melts, the extent of their utilization has nevertheless been limited by several serious shortcomings. Many of these failings can be directly attributed to the deleterious effects of one or more of the components which are included in the hot melt composition. Thus, for example, various types of rubbers are often incorporated in hot melts in order to impart flexibility and tackiness to the resulting adhesive. However, the rubbery materials or elastomers heretofore used in hot melts have not been entirely satisfactory principally because of the presence of unsaturated chemical bonds in the elastomer molecule. Thus, it has been found that the presence of these unsaturated elastomers in hot melts has made the adhesive composition susceptible to oxidation by sunlight or by the oxygen of the air and has also led to the degradation of the hot melt upon prolonged exposure to elevated temperatures.

In addition to the shortcomings attributable to the unsaturated nature of the elastomers heretofore employed in hot melts, other undesirable effects have attended their use in such adhesive compositions. The most serious of these effects has been the incompatibility of the elastomers with the other constituents of the adhesive formulation. This incompatibility is evidenced in the molten state by the separation of the elastomer from the remainder of the formulation, thereby resulting in two heterogenous layers. Such heterogeneous compositions do not therefore derive the improvements in properties which the addition of the elastomers is intended to impart.

It is an object of this invention to provide hot melt adhesive compositions which possess outstanding characteristics of flexibility, tackiness, and strength under widely varying conditions of temperature. Another object of this invention is to provide hot melt adhesive compositions which display remarkable properties of stability and resistance to degradation. A further object of this invention is to provide adhesive compositions which are characterized by their ability to adhere to a wide variety of substrates. Other objects and the advantages of this invention will be apparent from the discussion that follows hereinafter.

In accordance with the invention, hot melt adhesive compositions are prepared which comprise blends of ethylene:propylene copolymers with certain resin tackifiers, hereinafter defined, said blends being formulated using polyolefinic materials as carriers therefor. I have found that, in contrast to the elastomers heretofore employed, the ethylene:propylene copolymers impart toughness, increased viscosity, and good resistance to oxidative and thermal deterioration to the hot melt adhesives of my invention. In addition, the ethylene:propylene copolymers used in my composition form stable, compatible solutions with the other components of my formulations, thereby avoiding the difficulties presented by the elastomers of the prior art which formed heterogeneous mixtures in the molten state.

The ethylene:propylene copolymers are elastomeric materials which, for the purpose of my invention, should have a propylene content of from 25–75 mole percent, and a Mooney viscosity of from 15 to 60. Exemplary of the tackifiers that may be utilized in my invention are: natural rosins, such as gum rosin, wood rosin, and tall oil rosin; hydrogenated rosins, such as hydrogenated wood, gum, and tall oil rosins; esters of rosins, such as the methyl and glyceryl esters of wood rosin, gum rosin, or hydrogenated wood rosin; chlorinated biphenyl resins containing from 32% to 65% chlorine; methylated paraffinic chain hydrocarbon resins; and terpene polymers having softening points ranging from 10° C. to 135° C. In addition to the previously described tackifiers, atactic (i.e., amorphous) polypropylene can also be employed as a tackifier.

The carriers used for the adhesives of this invention may be either polyethylene or isotactic (i.e., crystalline) polypropylene. The polyethylene utilized as a carrier may range in molecular weight from about 2,000 to about 21,000. It is preferred, however, to employ polyethylene having a molecular weight of from 8,000 to 12,000. The isotactict polypropylene suitable for use as a carrier in my adhesives should have a melt flow (as determined by ASTM method D1238–57T) ranging from 5 to 100. Low molecular weight isotactic polypropylene having a melt viscosity of from 3,000 centipoises to 5,000 centipoises at 350° F. can also be used to prepare my hot metal adhesives. Similarly, blends of polyethylene and isotactic polypropylene can, if desired, be employed as carriers for my novel adhesives.

Various miscellaneous additives may be incorporated in the adhesive formulations of this invention. Of particular utility in adjusting viscosity and hardness is the use of waxes or wax-like materials including, for example, petroleum waxes such as paraffin and microcrystalline wax, or synthetic waxes such as Fischer-Tropsch wax.

The resin tackifiers previously described may be present in the formulations of this invention in amounts ranging from about 100 to 1000 parts per 100 parts, by weight, of the ethylene:proplyene copolymer. When a wax is added to the formulation, it may be present in amounts ranging from about 50 to about 200 parts per 100 parts, by weight, of the ethylene:propylene copolymer. As far as the polyolefin carrier is concerned, it may be present in amounts ranging from about 150 to about 1500 parts per 100 parts, by weight, of the ethylene:propylene copolymer.

In preparing the adhesives of my invention, about one-half of the tackifying resin is first melted at a temperature ranging from 200° to 400° F., whereupon the ethylene:propylene copolymer is added to the molten tackifier. The resulting mixture is blended until a smooth, homogeneous mass is obtained and the remainder of the formulation, i.e., the remainder of the tackifier, the polyolefin carrier, and other miscellaneous additives, are then added to the uniform mass. Thereafter, the entire mixture is blended until the mass is smooth and homogeneous. The final hot melt adhesive composition may then be used directly, or it may be extruded in rope or pellet form for use in an appropriate hot melt applicator. It should be noted that the adhesives of this invention can be applied by any of the hot melt applicators commonly used by the practitioner. Although these compositions can be applied in any thickness the practitioner finds expedient, it is preferred to employ coating thicknesses of from 0.5 mil to 25 mils.

The hot melt adhesives of my invention display several outstanding features. Of primary importance is the fact that the adhesive bonds derived from my hot melts are characterized by remarkable tackiness in the molten state and flexibility upon solidification. They also are extremely resistant to oxidative or thermal degradation and embrittlement at low temperatures. Moreover, my adhesives are highly stable as a result of the excellent compatibility displayed by the various components of said adhesives. The present compositions have the added advantage of possessing a low specific gravity which results from the very low specific gravity of the ethylene:propylene copolymers. This decreased specific gravity of my hot melts therefore leads to a considerable economic saving since less adhesive is required in order to cover a given area of substrate as compared to the use of adhesives of greater specific gravity. Furthermore, my adhesives are characterized by their ability to be readily coated onto and used for the lamination of various types of substrates, including, for example, metal foils, paper, coated paper, waxed paper, and polyethylene and polypropylene films.

In the following examples, which further illustrate the embodiment of my invention, all parts given are by weight unless otherwise indicated.

*Example I*

This example illustrates the preparation of the hot melt adhesive compositions of my invention.

82 parts of hydrogenated rosin were melted by heating at 300° F. and to this molten tackifier were added 100 parts of an ethylene:propylene copolymer having a propylene content of 47 mole percent and a Mooney viscosity of 49. The resulting mixture was blended until a smooth, homogeneous mass was obtained. To this homogeneous mass were added 83 parts of hydrogenated rosin, 396 parts of polyethylene (molecular weight=8,000) and 100 parts of Fischer-Tropsch wax, the entire mixture then being blended until homogeneity was obtained. The resulting homogeneous mass had a Brookfield viscosity of 59,000 cps. at 350° F. and showed excellent adhesion to polyethylene films.

*Example II*

This example further illustrates the preparation of the hot melt adhesive compositions of my invention.

The procedure detailed in Example I was employed to prepare the adhesive formulations set forth in the table appearing below.

The ethylene:propylene copolymer utilized in the formulations of this example had a propylene content of 47 mole percent and a Mooney viscosity of 49.

| Component | Formulation No. | | | |
|---|---|---|---|---|
| | 1 | 2 | 3 | 4 |
| Ethylene: propylene copolymer | 100 | 100 | 100 | 100 |
| Fischer-Tropsch wax | 200 | 200 | 100 | |
| Hydrogenated rosin | | | 166 | |
| Gum rosin | 166 | | | |
| Glycerol ester of hydrogenated rosin | | | 166 | |
| Polyethylene (molec. wt.=8,000) | 396 | 396 | 396 | 400 |
| Chlorinated biphenyl resin (containing 48% chlorine, by weight) | | | | 200 |

| Component | Formulation No. | | |
|---|---|---|---|
| | 5 | 6 | 7 |
| Ethylene: propylene copolymer | 100 | 100 | 100 |
| Polyethylene (molec. wt.=12,000) | 1,500 | 1,500 | 1,500 |
| Isotactic polypropylene (melt viscosity of 3,000 cps. at 375° F.) | | | 200 |
| Methyl ester of hydrogenated rosin | 300 | 300 | 300 |
| Paraffin wax | | 200 | |

The adhesive formulations listed in the above table exhibited remarkable properties of stability and resistance to degradation. In addition, these formulations were characterized by their ability to adhere to a wide variety of substrates.

Any departure from the above description which conforms to the present invention is intended to be included within the scope of the invention as defined by the following claims.

I claim:
1. A hot melt adhesive composition comprising a homogeneous mixture of a polyolefin selected from the group consisting of polyethylene and isotactic polypropylene, a resin tackifier and an ethylene:propylene copolymer, wherein said resin tackifier is selected from the group consisting of atactic polypropylene, natural rosins, hydrogenated rosins, rosin esters, and chlorinated biphenyl resins containing from 32 to 65% chlorine.

2. A hot melt adhesive composition comprising a homogeneous mixture of a polyolefin selected from the group consisting of polyethylene and isotactic polypropylene, a resin tackifier and an ethylene:propylene copolymer having a propylene content of from 25 to 75 mole percent and a Mooney viscosity of from 15 to 60, wherein said resin tackifier is selected from the group consisting of atactic polypropylene, natural rosins, hydrogenated rosins, rosin esters, and chlorinated biphenyl resins containing from 32 to 65% chlorine.

3. The adhesive composition of claim 2 wherein said resin tackifier is present in an amount ranging from 100 to 1000 parts per 100 parts of the ethylene:propylene copolymer, and said polyolefin is present in an amount ranging from 150 to 1500 parts per 100 parts of the ethylene:propylene copolymer.

4. The adhesive composition of claim 2 wherein said polyethylene has a molecular weight of from 2,000 to 21,000.

5. The adhesive composition of claim 2 wherein said isotactic polypropylene has a melt flow of from 5 to 100.

6. The adhesive composition of claim 2 wherein said isotactic polypropylene has a melt viscosity of from 3,000 to 5,000 centipoises, at 350° F.

References Cited by the Examiner

UNITED STATES PATENTS

| | | | |
|---|---|---|---|
| 2,349,508 | 5/1944 | Mack | 260—27 |
| 2,453,644 | 11/1948 | Steinkraus | 260—897 |
| 2,791,576 | 5/1957 | Field et al. | 260—897 |
| 3,036,987 | 5/1962 | Ranalli | 260—897 |
| 3,071,566 | 1/1963 | Cassar et al. | 260—93.7 |
| 3,102,876 | 9/1963 | Hogan | 260—88.2 |

LEON J. BERCOVITZ, *Primary Examiner.*